United States Patent [19]

Alheim

[11] Patent Number: 5,253,285
[45] Date of Patent: Oct. 12, 1993

[54] AUTOMATED INTERACTIVE TELEPHONE COMMUNICATION SYSTEM FOR TDD USERS

[76] Inventor: Curtis C. Alheim, 4 Anne Dr., Schenectady, N.Y. 12303

[21] Appl. No.: 887,677

[22] Filed: May 22, 1992

Related U.S. Application Data

[63] Continuation-in-part of Ser. No. 626,753, Dec. 13, 1990, Pat. No. 5,121,421.

[51] Int. Cl.⁵ .......................................... H04M 11/00
[52] U.S. Cl. ........................................ 379/52; 379/97; 340/825.19
[58] Field of Search ............................... 379/52, 96–99, 379/396, 93; 340/825.19

[56] References Cited

U.S. PATENT DOCUMENTS

| | | | |
|---|---|---|---|
| 3,381,276 | 4/1968 | James | 340/172.5 |
| 4,012,599 | 3/1977 | Meyer | 379/52 |
| 4,268,721 | 5/1981 | Nielson et al. | 379/52 |
| 4,307,266 | 12/1981 | Messina | 379/52 |
| 4,320,256 | 3/1982 | Freeman | |
| 4,426,555 | 1/1984 | Underkoffler | |
| 4,677,659 | 6/1987 | Dargan | 379/97 |
| 5,121,421 | 6/1992 | Alheim | 379/52 |

FOREIGN PATENT DOCUMENTS

| | | | |
|---|---|---|---|
| 58-134568 | 8/1983 | Japan | 379/52 |
| 1-162059 | 6/1989 | Japan | 379/52 |

*Primary Examiner*—Wing F. Chan
*Attorney, Agent, or Firm*—Heslin & Rothenberg

[57] ABSTRACT

A novel automated interactive telephone communication system and method are provided which allow a deaf or hard-of-hearing person, using a TDD device, to send and receive information over a conventional two-way telephone subscriber network. The automated processing system includes a receiving circuit coupled to the network to receive communication signals from the TDD caller and processing circuit for processing a received communication signal according to a predefined control matrix. The processing circuit includes a retrieval mechanism for selectively retrieving one of a plurality of separately addressed TDD displayable messages stored in an associated computer database. Also stored in the computer database are TDD mode characters for associated ones of the stored messages. Transmitting circuit is also provided for sending a retrieved TDD displayable message to the callers TDD for display.

19 Claims, 8 Drawing Sheets

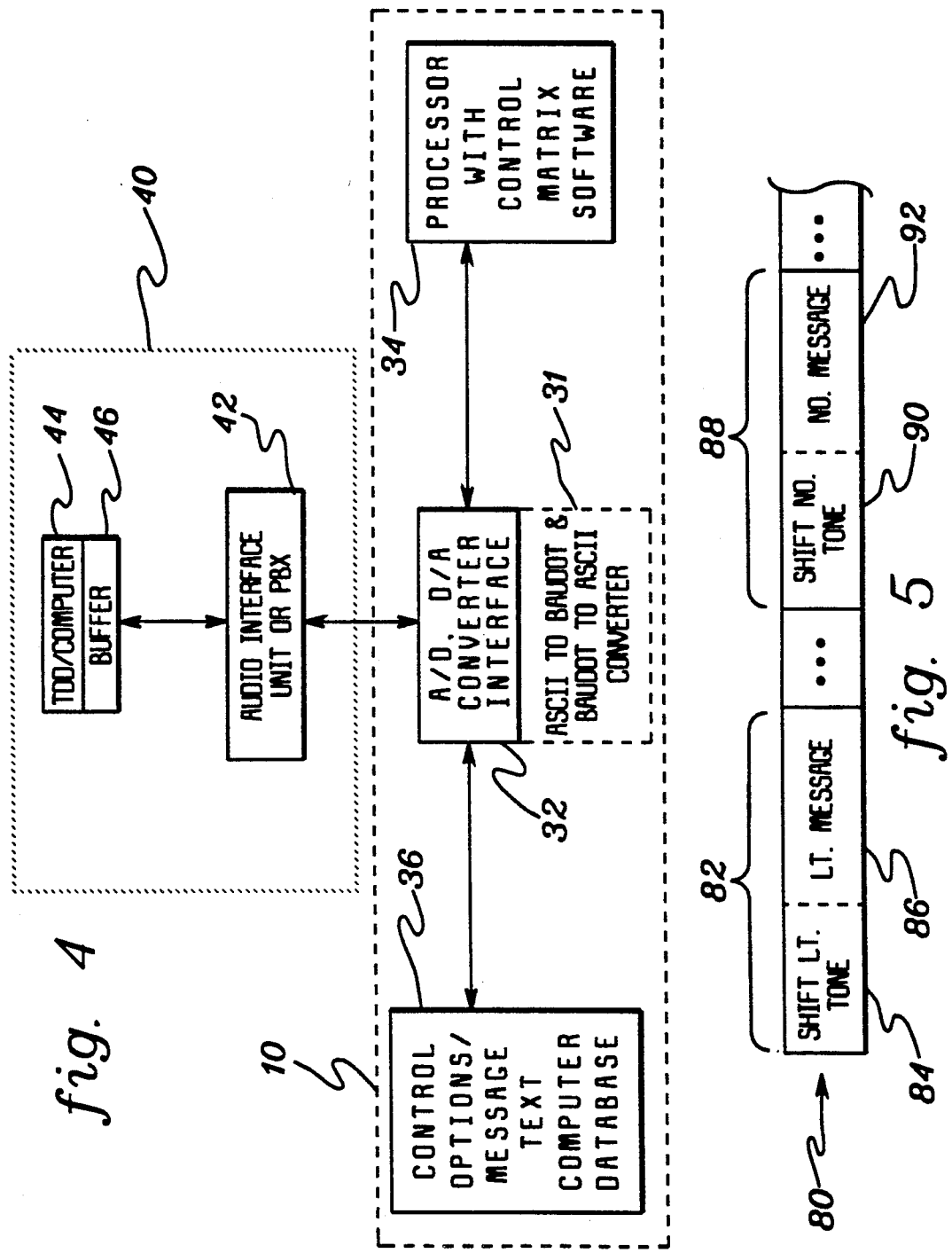

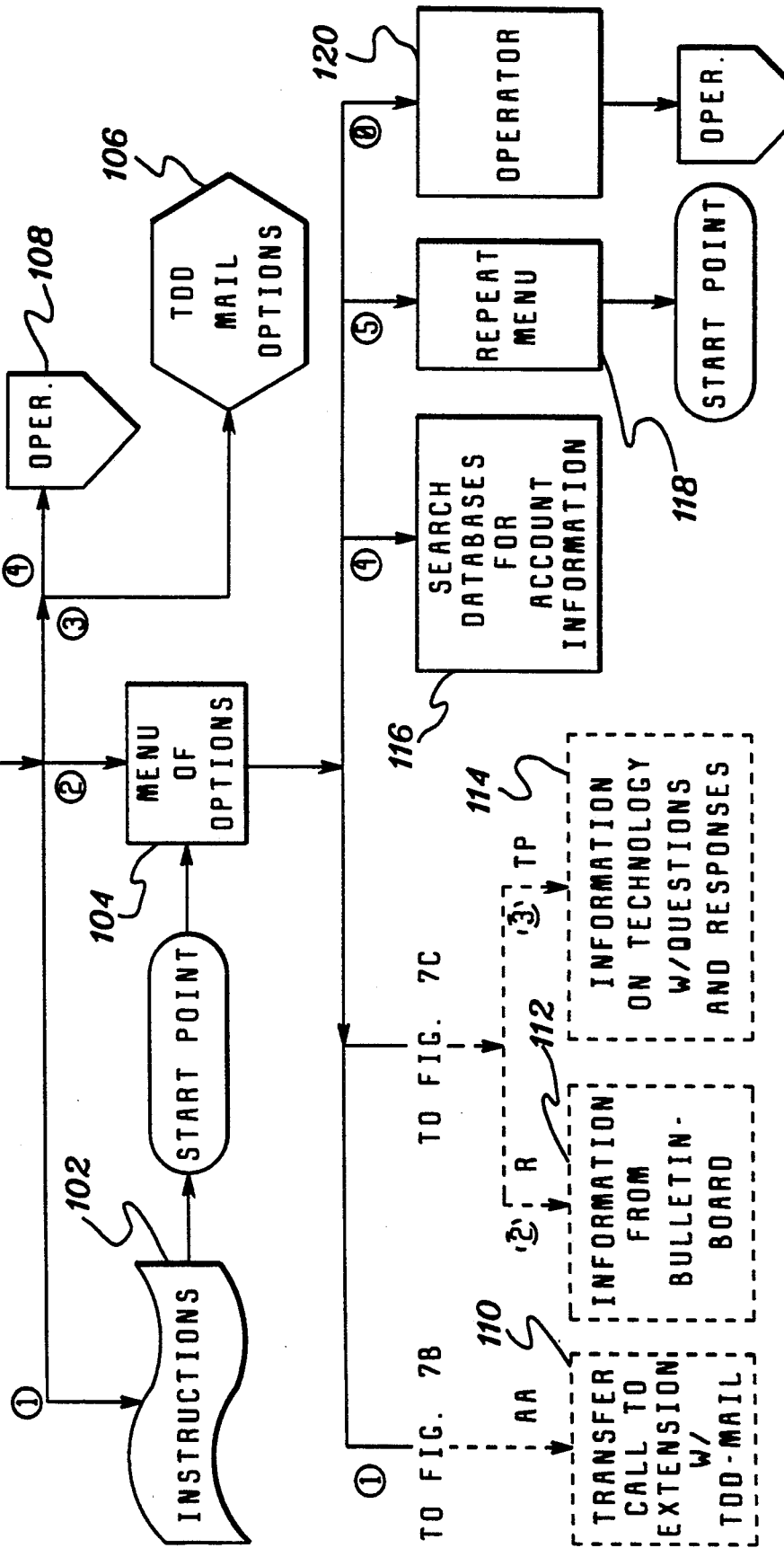

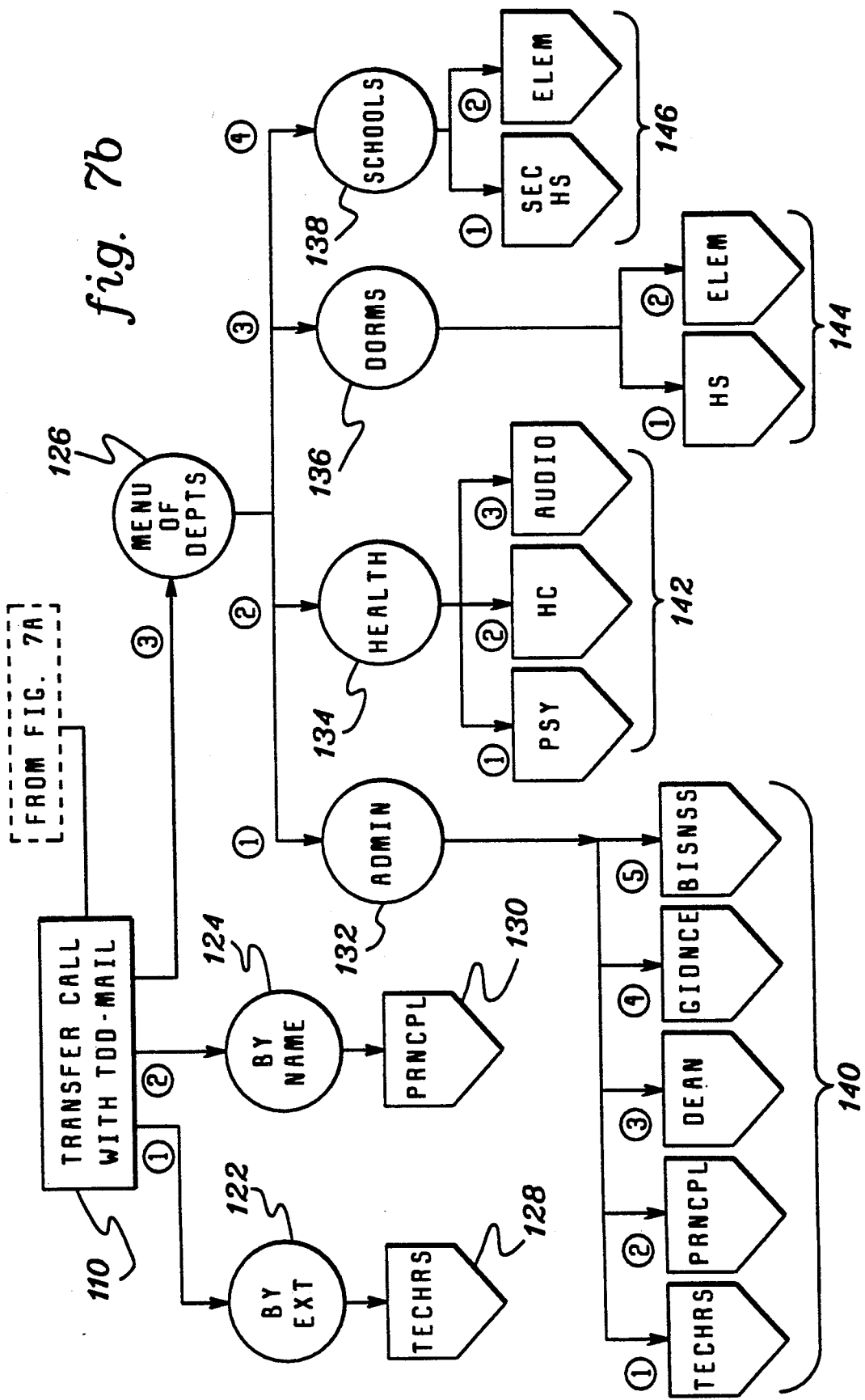

AUTOMATED INTERACTIVE TELEPHONE COMMUNICATION SYSTEM FOR TDD USERS

CROSS-REFERENCE TO RELATED APPLICATION

This application is a continuation-in-part of pending U.S. application Ser. No. 07/626,753, filed Dec. 13, 1990, now U.S. Pat. No. 5,121,421.

BACKGROUND OF THE INVENTION

1. Technical Field

The present invention relates to telephone communications and, more particularly, to novel automated interactive telephone communication systems and methods which allow multiple deaf and hard-of-hearing individuals, using a TDD, ASCII or other Baudot character displayable device (e.g., a device with ASCII capabilities), to send and receive information over a two-way telephone subscriber network without communicating directly with another person.

2. Description of the prior Art

Two-way telephone systems, which allow national and worldwide communication between individuals, normally provide for reception and output of sound energy. Because of this, deaf, hard-of-hearing or speech-impaired individuals (herein referred to as TDD users) were for a long period prevented from communication over this network. In relatively recent years, however, technology has evolved which allows such individuals to communicate over the telephone subscriber network. Specifically, teletype/telecommunication devices for the deaf (TDDs), also referred to as text-telephones (TT), are now readily available, and many public and private organizations have special telephone numbers for deaf, hard-of-hearing, or speech-impaired individuals, to call devoted exclusively to telecommunications using TDD equipment, such as a relay service. A TDD unit conventionally communicates with another TDD unit using specially coded tone signals, e.g., Baudot and like codes. When a Baudot signal is received, the TDD equipment converts the signal into a visual format for display to the user. In this manner, two individuals are able to communicate directly using an existing telephone subscriber network as the carrier.

Increasingly, there is a trend in both the public and private sector towards streamlining the handling of incoming telephone calls by the use of pre-recorded interactive voice systems. Verbal interrogation systems, or verbal multiple choice response systems are well known, such as exemplified by the system described in U.S. Pat. No. 4,320,256 and the patents cited therein. However, such interactive voice systems obviously terminate communication for a deaf or hard-of-hearing person. For example, since the deaf person is unable to hear the verbal instructions he cannot route his own call to an appropriate electronic mailbox or extension.

The present system, therefore, is designed to address this deficiency of existing interactive telephone interrogation technology and provide a deaf individual with the same direct access to automated telephone services, such as: automated attendant, "audio" text retrieval, transaction processing, etc., as that now enjoyed by hearing individuals.

SUMMARY OF THE INVENTION

Briefly described, the present invention comprises in one aspect an interactive telephone communication system designed to be connected to a two-way telephone subscriber network for automated processing of communication signals from a person communicating therewith over a telephone subscriber network using a TDD coupled to said network. The system includes a receiving circuit coupled to the network to receive communication signals from the caller and processing means for processing a received communication signal according to a predefined control matrix. The processing means includes retrieval means for selectively retrieving one of a plurality of separately addressed TDD displayable messages stored in an associated computer database. At least one of the messages includes a corresponding shift character. Transmitting means are also provided for sending a retrieved TDD displayable message to the caller's TDD for display. When the at least one message having the associated shift character is transmitted, the character precedes the message and places the caller's TDD in a proper receiving mode for the message to be displayed accurately. Depending upon the embodiment, the communication signal can comprise either a conventional touch-tone-type telephone signal, a rotary-type telephone signal, a Baudot signal, or other machine language signals such as ASCII or facsimile characters.

The present invention comprises in another aspect, an automated method implemented at a station coupled to a two-way telephone subscriber network for interactively responding to a telephone call from an individual communicating therewith over the telephone subscriber network using a character displayable TDD-tree device coupled to the network. The method includes the steps of: receiving at the station a communication signal from the caller; automatically processing a received communication signal according to a predefined control matrix, the processing including retrieving one of a plurality of separately addressed digitally encoded machine displayable messages for transmission to the caller over the network, the retrieved message having a TDD shift character associated therewith for placing the caller's device in proper mode for display of the message; and transmitting the retrieved message over the network to the caller's TDD device for display, thereby improving message accuracy by controlling the caller's TDD device.

The interactive telephone communication systems (and related methods) of the present invention provide a hearing-impaired caller with substantially the same automated telephone processing and information options as now enjoyed by hearing persons, including automated attendant, voice mail (i.e., TDD-Mail), "audio" text retrieval, transaction processing, and database searching, etc. The system is advantageously implementable with commercially available technologies and can accommodate voice, Baudot, ASCII facsimile and other types of communication signals. Further, in certain embodiments multiple communication signals can be simultaneously processed on a single platform. A proper machine mode character is preferably associated with each displayable message so that the system is able to ensure that the caller's equipment is in proper mode for display of the transmitted message.

BRIEF DESCRIPTION OF THE DRAWINGS

These and other objects, advantages and features of the present invention will be more readily understood from the following detailed description of certain preferred embodiments thereof, when considered in conjunction with the accompanying drawing in which:

FIG. 4 is a block diagram representation of one circuit embodiment useful in explaining loading of TDD displayable messages within the system of FIG. 1;

FIG. 5 depicts one embodiment of a concatenated message string pursuant to the present invention;

FIGS. 7a-7c depict a processing control overview for one embodiment of the present invention.

DETAILED DESCRIPTION OF PREFERRED EMBODIMENT

Figure 1:
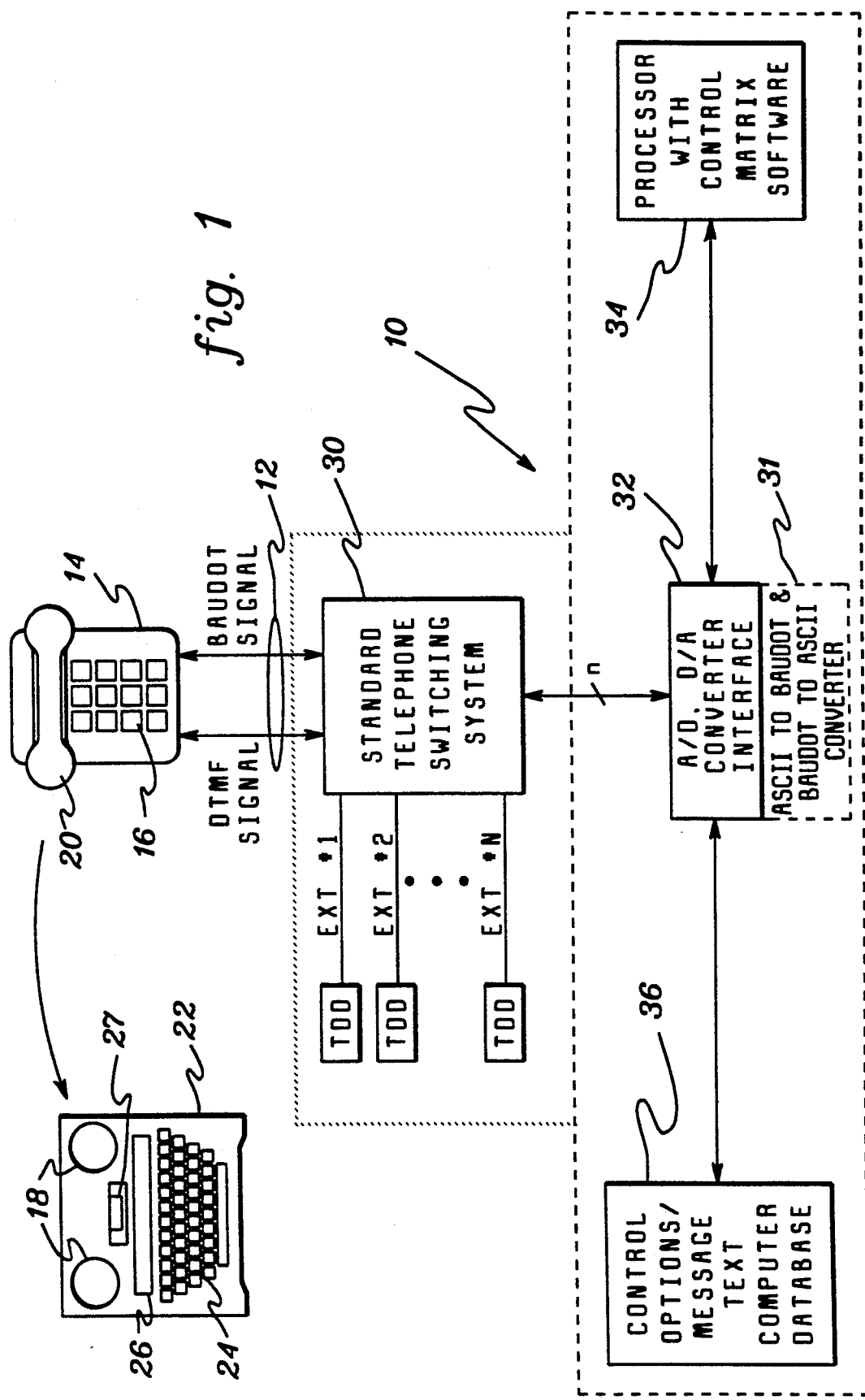
FIG. 1 is a functional block diagram of one preferred embodiment of the system of the present invention for hearing-impaired individuals communicating therewith via a conventional touch-tone-type telephone, which is one way to control the system.

Referring now to the drawings, wherein the same reference numbers are used throughout the various figures to designate the same or similar components.

One embodiment of the hearing-impaired automated interactive telephone communication system of the present invention, generally denoted 10, is shown in block diagram form in FIG. 1. System 10 is coupled to a conventional two-way telephone subscriber network 12 which includes at least one touch-tone-type telephone 14 coupled thereto. Telephone 14 comprises a conventional touch-tone-type telephone, such as available from AT&T, which includes a tone generator for selectively transmitting a plurality of unique frequencies separated by tone signal outputs over the two-way telephone subscriber network 12 and a key pad 16 which is conventionally connected to the tone generator for selecting the unique tone signal outputs to be transmitted over telephone subscriber network 12. More detailed information on the functioning of conventional touch-tone telephone 14 is available in the open literature; for example, see the discussion thereof provided by Freeman in U.S. Pat. No. 4,320,256, the entirety of which is hereby incorporated herein by reference. For purposes of the present invention it is sufficient to note that telephone 14 communicates over the two-way telephone subscriber network with standard dual-tone multi-frequency (DTMF) signals.

Coupled to telephone 14, e.g., by acoustic coupling through acoustic couplers 18 and telephone handset 20, is a teletype or telecommunications device for the deaf (herein referred to as a TDD 22). TDD 22 can comprise any commercially available TDD which allows deaf, hard-of-hearing or speech-impaired individuals to communicate over a two-way telephone subscriber network. Two principal manufacturers/marketers of TDD equipment for the deaf are Ultratec of Madison, Wis. and Krown Research, Inc. of Culver City, Calif. The present invention does not depend upon the particular type of TDD coupled to telephone 14. For example, a computer with appropriate TDD conversion software (see below) could be used.

TDD 22 includes a key pad 24 and a visually perceptible display 26, e.g., an LED display. In certain models, a hard copy printer 27 is also available. As is well known, unit 22 is conventionally used to communicate with another TDD (not shown) via a special code (e.g., Baudot, and more recently, ASCII) which when received is either converted into a readable message and presented on display 26 or stored in memory. In operation, a TDD user individual places a call to another individual who also has a TDD device by using the conventional touch-tone telephone, and once connection is established with the telephone call recipient, communication thereafter is through the TDD units and, in particular, their keyboards and associated displays.

The improvement of the present invention primarily resides in an automated telephone service system for a central location. For purposes of the present invention, the central location or station (e.g., a public agency or private business) represents one of the remote subscribers in the two-way telephone subscriber network 12, with the system 10 subscriber preferably having a unique dialing code for enabling selective connection of the subscriber to any particular telephone caller in the telephone subscriber network 12. A plurality of telephone callers may typically be accommodated by the central location subscriber at substantially the same time.

As noted, FIG. 1 depicts one preferred embodiment of the present invention. In this embodiment, system 10 includes a telephone switching system (PBX) 30 connected to network 12 and a plurality of telephone extensions, EXT #1, EXT #2, ..., EXT #N, therefrom. Preferably, each extension EXT #1, EXT #2, ..., EXT #N, has a TDD coupled or readily available thereto for communicating with a caller using TDD unit 22. Switching system 30 is well known in the open literature and comprises any conventional electronic telephone switching system for routing the various calls to the subscribers throughout the network dependent on the entered input to the switching system by the telephone subscribers. The functioning of the telephone switching system 30 is well understood by those of ordinary skill in the art. Any standard electronic telephone switching system 30 may be employed in system 10 of the present invention. Typically, system 30 will include a standard private branch exchange (PBX) which is coupled to the telephone subscriber network 12. The lines around switching system 30 vary somewhat from those around the remainder of system 10 because depending upon the implementation, call switching or forwarding may be unneeded, e.g., if only database or account searching capabilities are desired (as discussed further below).

Coupled to switching system 30 on the extension side is a telephone interface, herein referred to as A/D, D/A converter interface 32. Converter interface 32 may comprise any commercially available telephone interface card. One preferred such card is manufactured by Dialogic Corp. of Parsippany, N.J. 07054, and marketed as a Dialogic D41A communications card. Converter interface 32 transforms analog tone waveforms into digital signals (and vice versa), and preferably to discrete binary form for processing/storage. Pursuant to this embodiment, converter 32 transforms received DTMF signals into digital form for processing and converts stored messages from digital form to TDD receivable form, e.g., ASCII to Baudot (i.e., via interface 31), as described further below. Further, the referenced Dialogic interface is capable of accommodating multiple communications simultaneously, as is the rest of system 10. Also, those skilled in the art will be able to readily accomplish conversion of ASCII stored messages to Baudot signals using the above-referenced Dialogic interface and appropriate system 10 software.

Coupled to converter 32 is a processor 34 and an associated database storage 36. Processor 34 comprises any mini- or microcomputer based machine which contains automated telephone attendant application software, including an appropriate processing control matrix. A preferred application software package is marketed by Microlog of Germantown, Md. 20874, as Microlog Application Software for a Voice Interrogation Telephone System. One possible processor logic flow is described in detail below with reference to FIGS. 7a-7c. Also, an example of a specific message matrix for the referenced Microlog Software is set forth in Appendix A, along with examples of actual corresponding TDD messages therefor in Appendix B. (Examples of standard abbreviations used by individuals when communicating with TDD equipment are provided in Appendix C hereof.)

Continuing with FIG. 1, computer database 36 preferably comprises a hard disk drive having up to hundreds of hours of message storage (e.g., 600-800 megabytes). The large data storage in system 10 is necessary to accommodate the TDD displayable messages when "Store-and-Forward" techniques are used, e.g., messages converted from ASCII to Baudot, or coded directly in Baudot. (Storage of Baudot messages requires 3-4 times the amount of disk storage for the same message content as voice systems; however, as noted, ASCII-to-Baudot and Baudot-to-ASCII conversion is possible to minimize disk storage space.)

Contained in database 36 are various messages, such as those set forth in Appendix B, including control options and/or other message text which may be selectively retrieved for transmission to the TDD caller, i.e., depending upon the logic path of processor 34 within the control matrix of Appendix A (again, which is controlled by the caller through DTMF signals generated via telephone 14 and transmitted over network 12 to system 10, or Baudot signals generated by the TDD). Unique to the present invention is the storage of TDD displayable messages, e.g., Baudot or other similar codes, for retrieval and transmission to a TDD caller through the control matrix (Appendix A) of processor 34. A retrieved message is transformed to analog form by converter 32 and then sent through switching system 30, network 12 and telephone 14 to TDD 22 where the series of coded tones is converted to digital code for printing of characters on display 26.

As described with reference to FIGS. 7a-7c, pursuant to the present invention, modules implemented in Baudot for access by the deaf caller preferably include automated attendant, "audio" text retrieval, transaction processing, voice mail and interface to a mainframe for database searching. Briefly, applications for the system include: automated job availability; information hotlines (e.g. transportation information); interactive educational programs; home shopping markets; emergency notification and community alert programs; health monitoring systems for independent living; preregistration of out patient health care; quality of care information; account balance and expiration dates; forms and publication requests; and school registration and course selection; etc.

Figure 2:
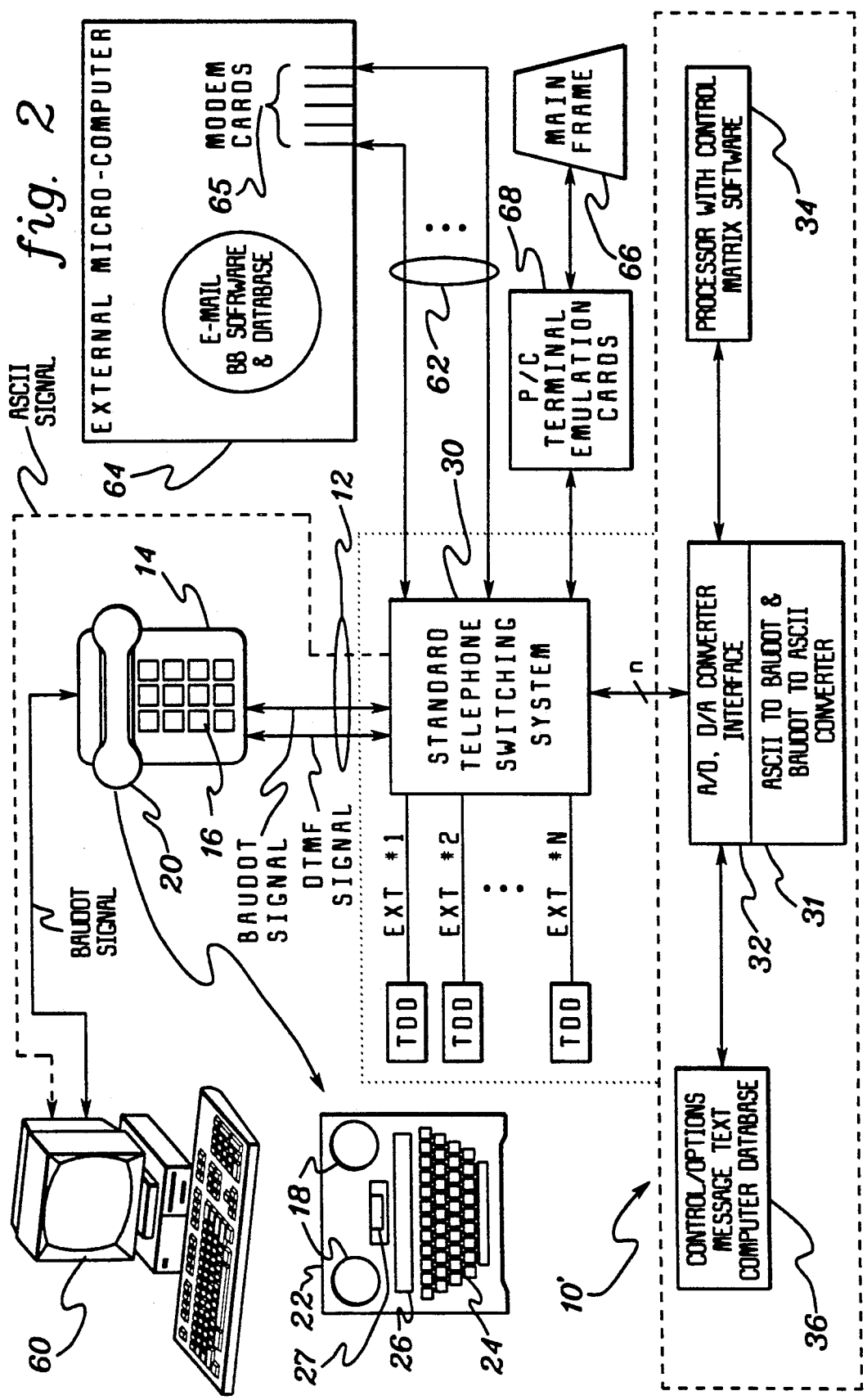
FIG. 2 is a functional block diagram of an alternate embodiment of the system of the present invention.

A second embodiment of a hearing-impaired automated interactive telephone communication system pursuant to the present invention, generally denoted 10', is depicted in FIG. 2. System 10' is substantially identical to system 10 of FIG. 1 except for the additional/modified structures described below.

As shown, a computer 60 is coupled to system 10' for communicating therewith over the two-way telephone subscriber network 12. Computer 60 can comprise, for example, any commercially available personal computer. Commercially available software, such as that marketed by Microflip, Inc. of Glenn Dale, Md., and special purpose modems is preferably used to convert computer 60 to a TDD-type communication machine. Two modems (not shown) can be used for interfacing system 10' and computer 60, one modem being configured for Baudot signals and the other for ASCII characters.

In operation, a TDD caller initially generates Baudot signals with computer 60 to communicate with system 10' through touch-tone-type telephone 14. Then, for example if the caller desires information from an external database, one of a plurality of lines 62 coupled to a separate microcomputer 64 is accessed. Access to lines 62 is controlled by system 10' via switching system 30. Each line of the plurality of lines 62 is shown to access the external computer 64 through a separate modem card 65. By way of example, computer 64 can oversee E-mail, bulletin board software and/or an informational database. Alternatively, an external mainframe computer 66 could be accessed through an appropriate pc terminal emulation card 68, which can also be coupled to an extension of switching system 30.

Figure 3:
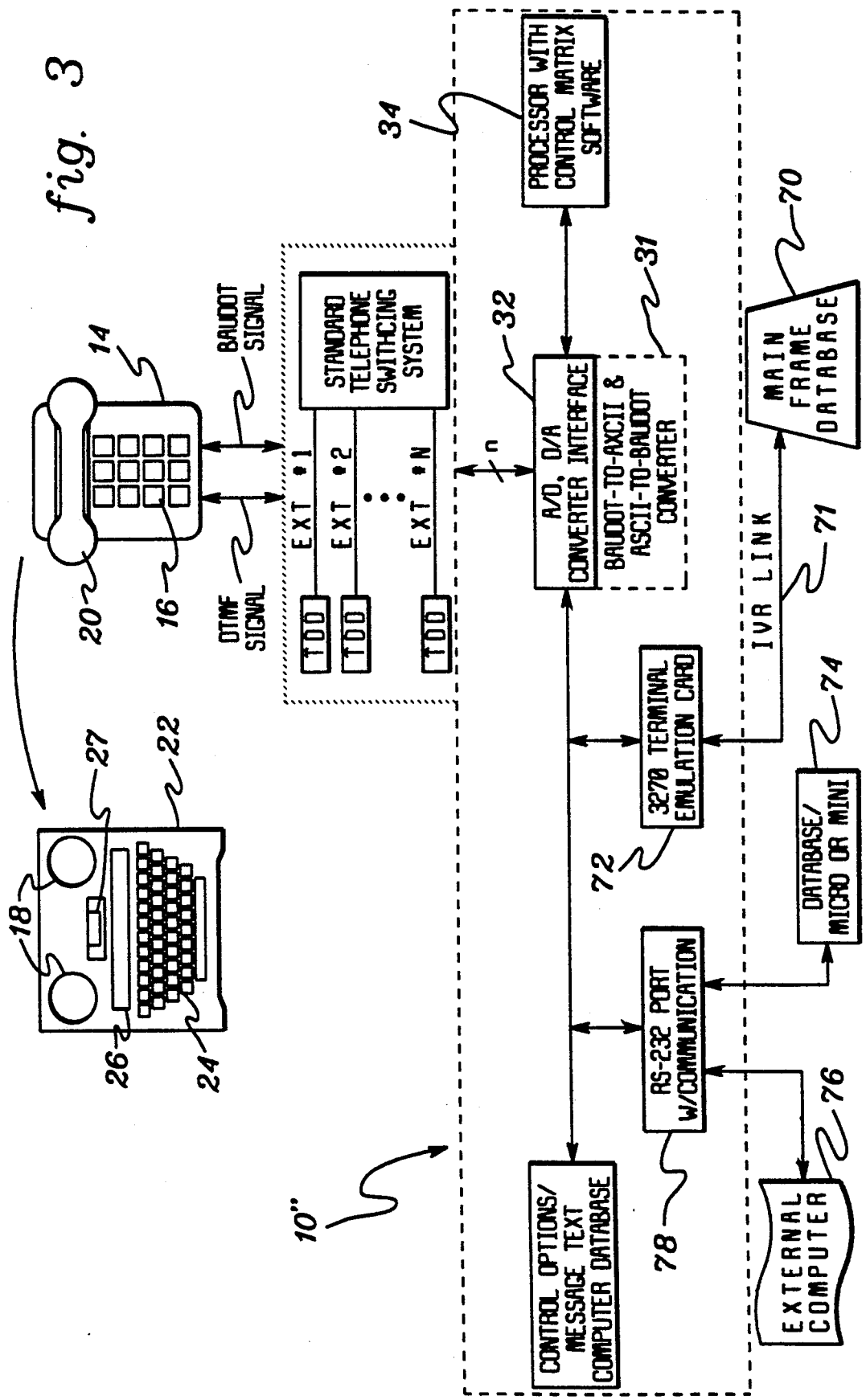
FIG. 3 is a functional block diagram of still another alternate embodiment of the system of the present invention.

Yet another embodiment of an interactive telephone communication system pursuant to the present invention, denoted 10', is depicted in FIG. 3. This embodiment is again similar to the embodiment of FIG. 1, however a direct access capability to various databases and/or external computers is added from an internal point in automated interactive telephone communication system 10". As shown, a real-time, mainframe database 70 is directly coupled via an IVR link 71 and a 3270 terminal emulation card 72 to an internal bus of system 10". A micro- or mini-computer database 74 and/or an external computer 76 can be coupled to system 10" internal bus via a standard RS232 port with communication 78 capabilities.

An automated telephone system (e.g., system 10 of FIG. 1, system 10' of FIG. 2, and system 10" of FIG. 3) can be configured for multiple application processing at a given time. For example, separate telephone numbers can be assigned to a single processing platform, wherein a first telephone number is assigned to a "hunt-group" of multiple extension and a second telephone number can be assigned to a second "hunt group". Obviously, the specific configuration of a given system will depend upon the application and anticipated usage. For example, multiple TDD users may automatically communicate with the system using the first "hunt-group," simultaneous with a hearing person automatically communicating therewith on the second "hunt-group." Alternatively, different communication applications (voice, Baudot, multiple languages, ASCII, etc.) can be configured on a single telephone number instead of different telephone numbers. Multiple languages could also be processed on a single telephone number. (For example, an international Consulate Office could record French, German and English messages in an automated telephone service, using a single (same) telephone number to process all three languages for Baudot or other communication applications.) A single telephone number may have "roll-over" capabilities to a plurality of extensions (i.e., a hunt-group). (Thus, for example, all extensions in a hunt-group could process either French, German or English.)

In one preferred embodiment, the automated telephone system of the present invention is implemented with an MS-DOS operating system. However, the novel aspects described herein could alternatively be implemented using UNIX, OS/2 or any other available operating system. The choice of operating system is not relevant to the novel concepts presented herein. A UNIX operating system would allow multiple simultaneous processing of communication signals from two or more callers. Further, the multiply processed communication signals could comprise different communication applications and protocols, i.e., voice, Baudot, ASCII, etc.

One approach to storing of TDD displayable messages in system 10 is depicted in FIG. 4. TDD displayable messages (e.g., Baudot messages) are preferably input to system 10 via an input system 40 configured as shown. Input system 40 is coupled to converter interface 32 (and, in particular, to the above-referenced Dialogic interface card). The referenced Microlog automated telephone application software is then used, via processor 34, to store information on hard disk 36. System 40 includes an audio interface unit (AIU) or PBX 42 and a TDD or computer 44 for input of messages. AIU/PBX 42 is connected directly to converter interface 32. One commercially available AIU 42 is manufactured and marketed by Microlog as an Audio Interface Unit.

TDD/computer 44 preferably comprises a commercially available model having a memory buffer 46 therein. For example, the Ultratec TDD Superprint ES unit contains 8 k of memory which allows transmission of prestored messages. Once initiated, transmission from such a TDD is at a standard 45.5 Baud, which is the standard rate for communications between TDD units in the United States. Thus, by predefining messages in memory buffer 46 it is possible to transmit a message to hard disk 36 at a standard rate for recordation, which means that whenever the message is retrieved by processor 34, it will be transmitted from system 10 at the same uniform rate. Another option, but less preferred, is to use TDD equipment having no buffer memory in which case inputted messages are sent directly through the audio interface unit and converter interface 32 to the database exactly as humanly typed. This means that any delays between typing of characters and/or errors in typing are stored to the hard disk substantially as they occur, i.e., "Store and Forward" recording.

As Baudot encoded messages are transmitted to system 10 for storage, converter 32 digitizes the information and processor 34 stores it in database 36 at an application program defined location, e.g., refer to Appendix A. Again, in the preferred embodiment, system 10 utilizes the referenced Microlog Application Software which includes logic for storing messages. These same commands are advantageously used pursuant to the present invention to store Baudot coded messages which will subsequently be selectively retrieved and displayed on a caller's TDD.

Another approach to storing of TDD displayable messages in system 10 is to use a word processor to enter ASCII coded messages which are stored on hard disk 36 of system 10. ASCII to Baudot interface 31 then converts a retrieved message to TDD decodable tones for transmission over network 12 to a caller's TDD. As noted above, those skilled in the art can accomplish this conversion using the referenced dialogic card or voice recognition cards and appropriate software for processor 34.

A typical TDD operates in two modes, i.e., either in a letters mode or a numbers mode. Letters mode is used to transmit and properly display received letters of the alphabet, while numbers mode is used to transmit and properly display received numbers and punctuation. If a caller's TDD terminates a transmission in numbers mode, e.g., by transmitting a period, the next message received will be displayed in numbers mode as well. Thus, the displayed message will appear as jumbled nonsense in the form of numbers and punctuation. A caller's TDD is typically brought back into the proper mode by the caller pressing a predesignated key.

In order to ensure that the receiving TDD is in proper mode before a message is displayed, the present invention appends an appropriate corresponding mode character to each transmitted message. For example, if a transmitted message comprises a letters mode character, word, phrase, sentence or paragraph, then the message is preceded by a special letters shift Baudot tone. Preferably, every message transmitted by the interactive telephone communication system is preceded by an appropriate mode character in order that the received message will always appear properly on the caller's equipment.

FIG. 5 depicts one embodiment of a message, denoted 80, transmitted from an automated interactive telephone communication system pursuant to the present invention. Message 80 is shown to comprise a string of different letter messages and number messages (a message may comprise a character, word, phrase, number string, sentence, or paragraph). A first prestored message unit 82 includes a shift letter tone 84 and a letter message 86. In one embodiment, message 82 can be prestored in the platform's computer database for retrieval as a single unit. Alternately, unit 82 could be concatenated by the control matrix software, i.e., shift letters mode 84 and letter message 86 need not be stored as a single unit.

A second example of a message unit, denoted 88, is also depicted. Unit 88 comprises a shift numbers mode 90 and a corresponding number message 92. As with message unit 82, unit 88 could be stored as a single message in the associated computer database of the automated interactive processing system or concatenated to the desired form. By associating an appropriate shift letter mode or shift number mode with each letter message or number message, respectively, to be transmitted by the system, the system guarantees that the caller's receiving TDD is set to the proper mode for reception at the associated message. Thus, all characters will be properly displayed on the receiving TDD.

Figure 6:
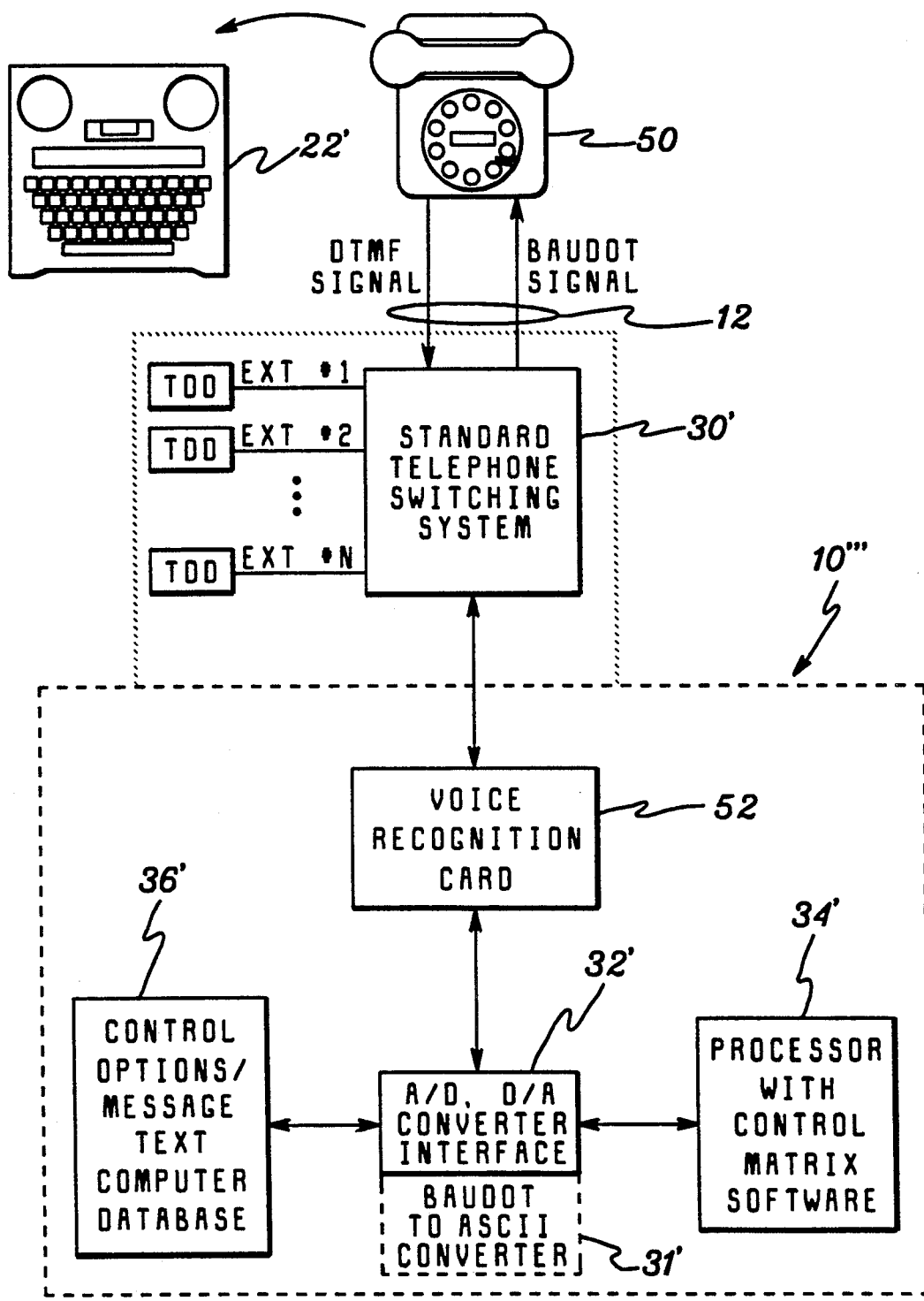
FIG. 6 is a functional block diagram of an enhanced embodiment of the system of the present invention capable of communicating with a hearing-impaired individual using a TDD with either a conventional rotary-type telephone or a touch-tone-type telephone coupled thereto.

An alternate, enhanced embodiment of the automated interactive telephone communication system, generally referred as 10''', is shown in FIG. 6. (In FIG. 6, similar structures to those introduced in FIG. 1 are referenced by similar numerals.) System 10''' is depicted in connection with a rotary telephone but is in fact more general than the touch-tone-type telephone embodiment of FIG. 1 since the system can accommodate callers using either a conventional rotary-type telephone or a touch-tone-type telephone. In fact, with newer TDD equipment a separate telephone can be unnecessary since these TDD units can be coupled directly to the subscriber telephone network and not through an acoustic coupler. As referenced below, system 10''' can also be programmed by one skilled in the art to readily handle these devices.

As depicted, system 10''' is coupled to the two-way telephone subscriber network 12, as is rotary-type telephone 50. Telephone 50 again couples acoustically with a TDD 22', which is identical to the unit described above with reference to FIG. 1. System 10''' includes a conventional, telephone switching system (PBX) 30', A/D, D/A converter interface 32' (and, possibly, ASCII to Baudot interface 31'), processor 34' and computer database 36', which contains stored control options and message text to be selectively retrieved and transmitted to the caller's TDD. Each of these components is substantially identical in this embodiment to the corresponding components described above with reference to the embodiment of FIG. 1. Added to this system, however, is a dependent voice recognition card 52 which operates (where necessary) to convert rotary type telephone signals to DTMF signals before passing the signals to converter 32'. Once converted to DTMF signals the signal processing proceeds identically to that described above with respect to the DTMF signals generated by the touch-tone-type telephone. In one embodiment, voice recognition card 52 can comprise a card such as that marketed by Dialogic Corporation of Parsippany, N.J., as VR/121 TM Speaker-Independent Voice Recognition System, or Scott Instruments Corporation of Denton, Tx. as SIR Model 20 Recognition Processor. With this card, system 10''' is able to interactively respond to a TDD caller to the system using either a touch-tone-type telephone or a conventional rotary dial telephone. Further, a person skilled in the art is able to modify the voice recognition card marketed by Dialogic/Scott Instruments to recognize TDD coded signals (e.g., Baudot signals) and convert such signals into DTMF signals which may then be processed/stored by system 10'''. In such a system, the caller's TDD would be used to directly control system 10'''. Those skilled in the art will also recognize that retrieved information coded in Baudot can pass through card 52 by first delivering an appropriate code to disable the card.

An operational overview of one embodiment of an automated telephone response system pursuant to the present invention will now be described with reference to the control options or matrix presented in FIGS. 7a-7c. This particular matrix would be useful, for example, to a school and, in particular, to a school dedicated to teaching deaf students. It should be noted, however, that this overview is merely illustrative and is not critical to implementation of the present invention. Those skilled in the art will recognize that other call-flow diagrams may be constructed depending upon the central location requirements. In most, if not all cases, commercially available automated telephone attendant application software, such as the above-reference Microlog Application Software, allows ready configuration and/or reconfiguration of the control/message matrix to meet an organization's specific needs. (Further, applicant has discovered that such software when used in combination with a converter interface (described above) allows separate recordation of TDD displayable messages and, with relatively straightforward modification, conversion of ASCII signals to Baudot signals (and vice versa) for transmission over the network.)

Referring now to FIG. 7a, a TDD caller initially receives a TDD displayable greeting after making connection to the system, i.e., after dialing the appropriate subscriber telephone number to access the system, 100 "Greeting." The greeting presents the caller with several control options, e.g., signal "1" (i.e., on the associated telephone) for system instructions, "2" for a menu of options, "3" for TDD mail options and "4" for operator assistance. Typically, in a first encounter a caller signals "1" for an overview of system functions, 102 "Instructions." Subsequent to display of the instructions, the system automatically transmits a menu of options, 104 "Menu of Options." This menu is also referred to as the "Start Point" to which the processor returns upon completing various functions within the routine. In the alternative, greeting 100 provides the caller with the choice to proceed directly to menu of options 104 by signalling "2". The third and fourth control choices to the caller are to proceed to TDD mail options, 106 "TDD Mail Options," or request operator assistance, 108 "OPER." TDD mail options would, for example, allow a caller who had a TDD mail extension within the system to retrieve any messages which may have been left by a TDD caller. Further information on typical TDD mail options is presented in Appendix D.

Figure 7C:
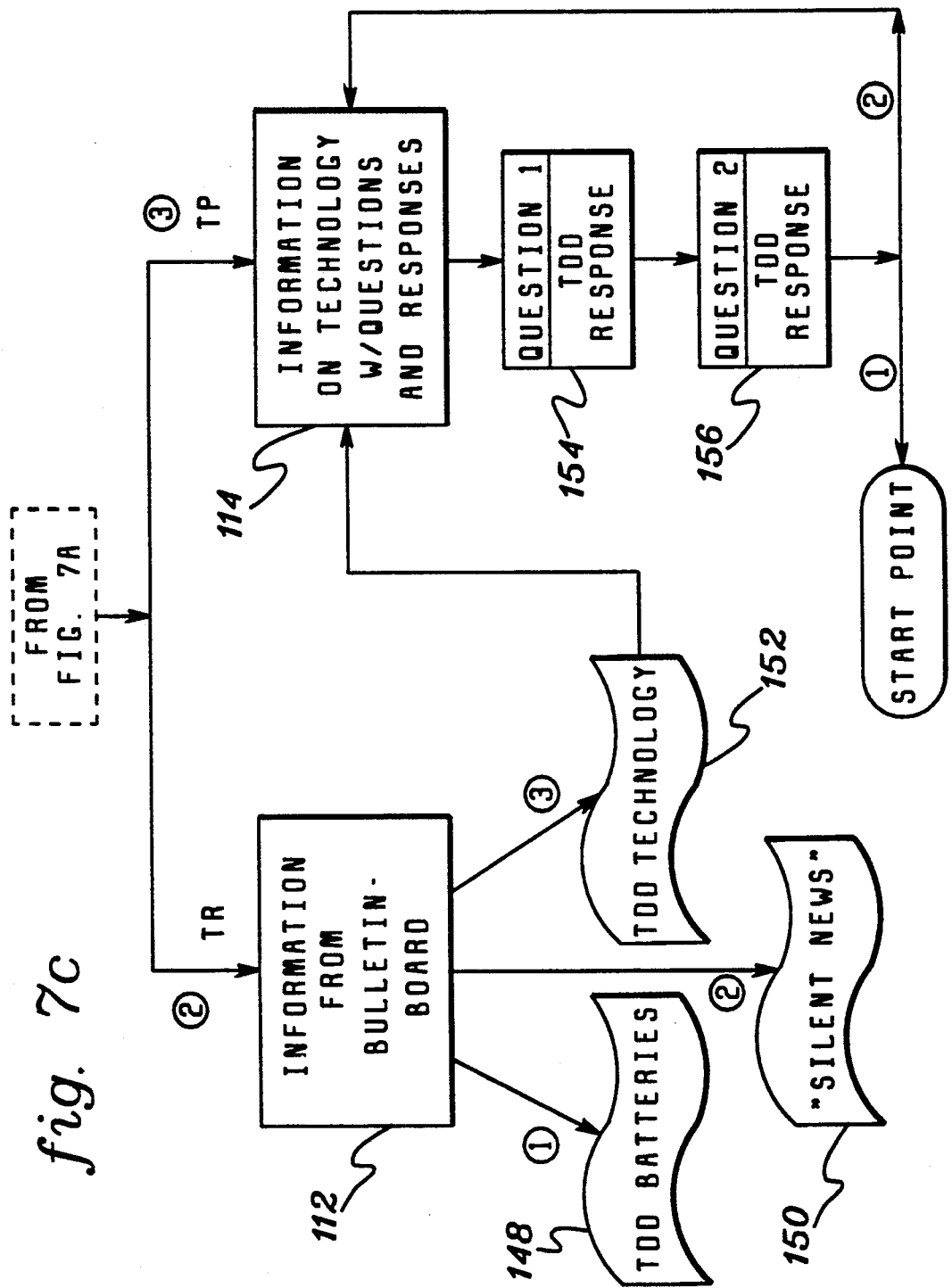

In this embodiment, menu of options 104 next presents the caller with a choice between automated attendant (AA), 110 "Transfer Call to TDD-Mail," text retrieval (TR), 112 "Information From Bulletin Board," transaction processing (TP), 114 "Information on Technology With Questions and Responses," account searching, 116 "Search Database For Account Information," (then return to menu of options (104)) 118 "Repeat Menu" (from which the processor returns to the "start point"), and request operator assistance, 120 "Operator." An example of one embodiment for automated attendant (AA) is provided in FIG. 7b, while examples of text retrieval (TR) and transaction processing (TP) are set forth in FIG. 7c.

From menu of options 104 (FIG. 7a), if the caller signals "1" then the call is transferred to an extension with TDD mail 110 (FIG. 7b), which in this embodiment presents the caller with three options, namely, transfer to a particular extension by extension number, 122 "By Extension," transfer to a particular extension number by name of person, or truncated version thereof, at that extension 124 "By Name," or view a menu of departments in order to route the call to a particular extension by subject matter, 126 "Menu of Depts." Assuming that the caller knows either the extension number or name of the person to be reached then the processor and switching system are instructed to transfer the call to, for example, the teacher's extension number, 128 "Techrs.," or to the principal's extension, 130 "Prncpl."

If the caller is unaware of the appropriate extension number, then menu of options 126 provides a choice between (again for example) administration, 132

"Admin.", health, 134 "Health", dormitories, 136 "Dorms", and school levels, 138 "Schools." If administration numbers are selected, i.e., by signalling "1" via the telephone, the caller is provided with a further option of transferring the call to a teacher, principal, dean, guidance counselor or business administration individual, generally denoted 140. Similarly, if the call involves a health issue the caller is transferred to a further menu providing a choice between the psychologist, health center or audiologist, 142. The dorms 136 and schools 138 options each provide a further choice between high school and elementary school phone numbers.

Should the caller have desired text retrieval (TR) or transaction processing (TP) then they would have followed the path from options display 104 (FIG. 7a) to information retrieval operation 112 and/or information interrogatories 114 (FIG. 7c). If text retrieval is desired, the caller is presented with a choice between, for example, information relating to TDD batteries, 148 "TDD Batteries," news for deaf individuals, 150 "Silent News," and the latest information on TDD technology in general, 152 "TDD Technology." In the control matrix embodiment depicted, the caller is also provided with an option to follow the path from TDD technology information to transaction processing (TP) 114. Transaction processing 114 typically includes a series of questions, subsequent each of which the caller is provided with a chance to respond thereto, the response being collected (for example) in a survey type format. After answering the applicable questions, the caller is presented with the further option of returning to the main menu or taking a different path within transaction processing (TP).

Again, those skilled in the art will recognize that various call flow diagrams may be constructed depending upon the particular central location requirements.

It will also be noted from the above discussion that the present invention comprises a novel method for automated processing of telephone calls from deaf and hard-of-hearing individuals. Briefly, this automated processing method includes the steps of: receiving at a central location a communication signal from a TDD caller; transmitting a TDD displayable message to the caller's TDD as an acknowledgement of connection to the central location, along with a first TDD displayable control option to which the caller responds by generating a predefined communication signal for transmission over the network to the central location; automatically processing a received communication signal representative of a selected control option according to a predefined control matrix, the processing of a selected option including retrieving one of a plurality of separately addressed digitally encoded TDD displayable signals for transmission to the caller's TDD over the network, the retrieved signal consisting of either a TDD displayable message or a second TDD displayable control option; and transmitting the retrieved TDD displayable signal over the network to the caller's TDD for display.

It will be observed from the above description that the present invention satisfies an important need, i.e., providing automated telephone communication for deaf and hard-of-hearing individuals. In particular, the system (and method) of the present invention provides TDD callers with automated attendant, voice mail (i.e., TDD-mail), text retrieval, transaction processing, database searching, etc. The system is [also] advantageously implemented with presently available commercial technologies and can accommodate multiple communication protocols, signals, languages and analog frequencies.

Although several embodiments have been illustrated in the accompanying drawings and described in the foregoing detailed description, it will be understood that the invention is not limited to the particular embodiments discussed herein but is capable of numerous rearrangements, modifications and substitutions without departing from the scope of the invention. For example, the concepts comprising the present invention could be implemented within a limited vocabulary automated-relay service such that a deaf person using a TDD, could converse with a hearing person automatically. Also, speaker independent voice recognition technology could be used to capture and convert spoken words to Baudot character signals which would control displayable output of a caller's TDD device. In addition, Baudot characters from a deaf TDD user could be converted to ASCII strings and further converted to synthesized or digitized voice output and transmitted to a hearing individual automatically. The following claims are intended to encompass all such modifications.

APPENDIX A

MESSAGE MATRIX 'TDD1.MTX'
\* before Current Event indicates tone message
? before Current Event indicates missing message
d before Current Event indicates a dummy message
+ after R indicates that a description message exists

| Event Description | Current Event | | r=1 | r=2 | r=3 | r=4 | r=5 | r=6 | r=7 | r=8 | r=9 | r=0 | blank |
|---|---|---|---|---|---|---|---|---|---|---|---|---|---|
| Line Assignments | | | | | | | | | | | | | 1 |
| | d | 1 | 51 | 1 | Z6 | | | | | 1 | | | ON |
| | d | 2 | 51 | 1 | Z6 | | | | | 1 | | | ON |
| | d | 3 | 51 | 1 | Z6 | | | | | 1 | | | ON |
| | d | 4 | 51 | 1 | Z6 | | | | | 1 | | | ON |
| | d | 5 | 51 | 1 | Z6 | | | | | 1 | | | ON |
| | d | 6 | 51 | 1 | Z6 | | | | | 1 | | | ON |
| | d | 7 | 51 | 1 | Z6 | | | | | 1 | | | ON |
| | d | 8 | 51 | 1 | Z6 | | | | | 1 | | | ON |
| | d | 9 | 51 | 1 | Z6 | | | | | 1 | | | ON |
| | d | 10 | 51 | 1 | Z6 | | | | | 1 | | | ON |
| | d | 11 | 51 | 1 | Z6 | | | | | 1 | | | ON |
| | d | 12 | 51 | 1 | Z6 | | | | | 1 | | | ON |
| | d | 13 | 51 | 1 | Z6 | | | | | 1 | | | ON |
| | d | 14 | 51 | 1 | Z6 | | | | | 1 | | | ON |
| | d | 15 | 51 | 1 | Z6 | | | | | 1 | | | ON |
| | d | 16 | 51 | 1 | Z6 | | | | | 1 | | | ON |
| | d | 17 | 55 | 1 | Z6 | | | | | 1 | | | ON |

APPENDIX A-continued

MESSAGE MATRIX 'TDD1.MTX'
\* before Current Event indicates tone message
? before Current Event indicates missing message
d before Current Event indicates a dummy message
+ after R indicates that a description message exists

| Event Description | | Current Event | r=1 | r=2 | r=3 | r=4 | r=5 | r=6 | r=7 | r=8 | r=9 | r=0 | blank |
|---|---|---|---|---|---|---|---|---|---|---|---|---|---|
| | d | 18 | 55 | 1 | Z6 | | | | | 1 | | | ON |
| | d | 19 | 55 | 1 | Z6 | | | | | 1 | | | ON |
| | d | 20 | 55 | 1 | Z6 | | | | | 1 | | | ON |
| | d | 21 | 55 | 1 | Z6 | | | | | 1 | | | ON |
| | d | 22 | 55 | 1 | Z6 | | | | | 1 | | | ON |
| | d | 23 | 55 | 1 | Z6 | | | | | 1 | | | ON |
| | d | 24 | 55 | 1 | Z6 | | | | | 1 | | | ON |
| | d | 25 | 55 | 1 | Z6 | | | | | 1 | | | ON |
| | d | 26 | 55 | 1 | Z6 | | | | | 1 | | | ON |
| | d | 27 | 55 | 1 | Z6 | | | | | 1 | | | ON |
| | d | 28 | 55 | 1 | Z6 | | | | | 1 | | | ON |
| | d | 29 | 800 | 1 | Z6 | | | | | 1 | | | ON |
| | d | 30 | 800 | 1 | Z6 | | | | | 1 | | | ON |
| | d | 31 | 158 | 1 | Z6 | | | | | 1 | | | ON |
| | d | 32 | 158 | 1 | Z6 | | | | | 1 | | | ON |
| | d | 39 | P99 | P606 | | | | | | | | | Z1 |
| havent responded | | 40 | 39 | | | | | | | | 5 | 3 | A99 |
| nysd auto system | | 41 | 42 | | | | | | | | | | 42 |
| | d | 42 | 64 | 63 | | | | 0800 | 1700 | | | | X |
| | d | 47 | 50 | 49 | 48 | 60 | 60 | 60 | 60 | 60 | 60 | 60 | 140 |
| Holiday | | 48 | 64 | | | | | | | | | | 64 |
| Bad weather | | 49 | 64 | | | | | | | | | | 64 |
| Emergency | | 50 | 64 | | | | | | | | | | 64 |
| | d | 51 | 52 | 53 | 54 | | | 1200 | 1800 | 2359 | | | X |
| Good Morning | | 52 | 178 | | | | | | | | | | 178 |
| Good Afternoon | | 53 | 178 | | | | | | | | | | 178 |
| Good Evening | | 54 | 179 | | | | | | | | | | 178 |
| | d | 55 | 56 | 57 | 58 | | | 1200 | 1800 | 2359 | | | X |
| Good Morning | | 56 | 47 | | | | | | | | | | 47 |
| Good Afternoon | | 57 | 47 | | | | | | | | | | 47 |
| Good Evening | | 58 | 47 | | | | | | | | | | 47 |
| | d | 60 | 64 | 64 | 64 | 64 | 64 | 64 | 64 | 64 | 64 | 61 | M1 |
| | d | 61 | 64 | 62 | 62 | 62 | 62 | 62 | 64 | 48 | | | W |
| | d | 62 | 63 | 64 | | | | 0800 | 1700 | | | | X |
| | d | 63 | 178 | 1 | Z1 | | | | | 1 | | | ON |
| | d | 64 | 178 | 2 | Z1 | | | | | 1 | | | ON |
| main menu | \* | 65 | 116 | 200 | 228 | 65 | | 155 | 864 | 67 | 800 | 176 | 176 |
| Press 1, Night | \* | 66 | 116 | 200 | 228 | 66 | | 155 | 864 | 67 | 800 | 133 | 133 |
| get name | | 67 | 68 | | | | | | | | | | 68 |
| | d | 68 | 983 | 1 | Z8 | | | | | 1 | | | ON |
| | d | 69 | 73 | 72 | 71 | 70 | 162 | 70 | 72 | | | | Z9 |
| | d | 70 | | T> | &L2 | | | 90 | | | | 131 | 40 |
| | d | 71 | 176 | 133 | | | | | | | | | Z1 |
| | d | 72 | 74 | T> | E0 | 5 | | | | | | 70 | 134 |
| | d | 73 | 74 | T> | &0 | | | | | | | | |
| | d | 74 | 80 | 80 | 75 | 80 | 75 | 80 | 75 | 75 | 75 | 75 | M2 |
| echo name (blank) | | 75 | 80 | S | [&0] | NES | | | | | | | 80 |
| | d | 79 | 104 | T> | &0 | | | | | | | | Z1 |
| | d | 80 | 975 | 979 | | | | | | | | | |
| | d | 81 | 82 | 2 | Z2 | | | | | 1 | | | ON |
| Enter Name, 111 Dept | | 82 | 83 | | | | | | | | | | 83 |
| | d | 83 | 983 | 2 | Z8 | | | | | 1 | | | ON |
| | d | 84 | 88 | 87 | 85 | 70 | 163 | 70 | 87 | | | | Z9 |
| | d | 85 | 86 | 71 | | | | | | | | | Z2 |
| | d | 86 | 82 | 2 | Z2 | | | | | 1 | | | ON |
| | d | 87 | 89 | T> | E0 | 5 | | | | | | 70 | 134 |
| | d | 88 | 89 | T> | &0 | | | | | | | | |
| | d | 89 | | T> | &L2 | | | 90 | | | | 104 | |
| Department listing | \* | 90 | 91 | 92 | 93 | 94 | 90 | | | | | 39 | 40 |
| admin offices | \* | 91 | 95 | 96 | 97 | 98 | 99 | 91 | | | | 39 | 40 |
| health offices | \* | 92 | 100 | 101 | 102 | 92 | | | | | | 39 | 40 |
| dorms | \* | 93 | 103 | 181 | 93 | | | | | | | 39 | 40 |
| schools | \* | 94 | 182 | 183 | 94 | | | | | | | 39 | 40 |
| | d | 95 | 79 | COPY | 101 | T> | | | | | | | |
| | d | 96 | 79 | COPY | 102 | T> | | | | | | | |
| | d | 97 | 79 | COPY | 103 | T> | | | | | | | |
| | d | 98 | 79 | COPY | 104 | T> | | | | | | | |
| | d | 99 | 79 | COPY | 105 | T> | | | | | | | |
| | d | 100 | 79 | COPY | 106 | T> | | | | | | | |
| | d | 101 | 79 | COPY | 107 | T> | | | | | | | |
| | d | 102 | 79 | COPY | 108 | T> | | | | | | | |
| | d | 103 | 79 | COPY | 109 | T> | | | | | | | |
| | d | 104 | 106 | 105 | 106 | 106 | 105 | 105 | 106 | 105 | 105 | 105 | M2 |
| Transfer to ... | | 105 | 106 | S | 105 | [&0] | NES | | | | | | 106 |
| | d | 106 | 107 | 108 | | | | | | | | | Z1 |

APPENDIX A-continued

MESSAGE MATRIX 'TDD1.MTX'
* before Current Event indicates tone message
? before Current Event indicates missing message
d before Current Event indicates a dummy message
+ after R indicates that a description message exists

| Event Description | | Current Event | r=1 | r=2 | r=3 | r=4 | r=5 | r=6 | r=7 | r=8 | r=9 | r=0 | blank |
|---|---|---|---|---|---|---|---|---|---|---|---|---|---|
| | d | 107 | 109 | T> | E5 | | | | | | 112 | 108 | |
| | d | 108 | 109 | T> | E9 | | 111 | 110 | | | 112 | 70 | |
| Busy | | 109 | 113 | | | | | | | | | | 113 |
| Not In | | 110 | 136 | S | [&0] | NES | 110 | | | | | | 136 |
| | d | 111 | 975 | 979 | | | | | | | | | Z1 |
| No Answer | | 112 | 113 | | | | | | | | | | 113 |
| | d | 113 | 114 | 115 | | | | | | | | | Z1 |
| 1=P>;2=new;3=vs;0=Op | * | 114 | P> | 81 | 975 | | 114 | | 141 | | 141 | 176 | A99 |
| 1=P>;2=new;3=vs | * | 115 | P> | 81 | 979 | | 115 | | 141 | | 141 | 165 | A99 |
| | d | 116 | 117 | 120 | 81 | 81 | 81 | 81 | 81 | 81 | 81 | 81 | M3 |
| | d | 117 | 118 | 119 | | | | | | | | | Z1 |
| EXT/NAME/DEPT'S/0 | * | 118 | 120 | 81 | 90 | | 118 | | 172 | 67 | 800 | 176 | A99 |
| EXT/NAME/DEPT'S/RPT | * | 119 | 120 | 81 | 90 | | 119 | | 172 | 67 | 800 | 166 | A99 |
| EXTENSION | * | 120 | 139 | T3 | E7 | 5 | | | | | | 126 | 71 |
| Busy | | 121 | 123 | | | | | | | | | | 123 |
| No Answer | | 122 | 123 | | | | | | | | | | 123 |
| | d | 123 | 124 | 125 | | | | | | | | | Z1 |
| 1=P>;2=new;3=vs;0=Op | * | 124 | P> | 118 | 129 | | 124 | | 142 | | 142 | 176 | A99 |
| 1=P>;2=new;3=vs;0=Op | * | 125 | P> | 118 | 129 | | 125 | | 142 | | 142 | 167 | A99 |
| | d | 126 | 121 | T> | EX | | | | | | 122 | | |
| | d | 127 | 128 | T> | &0 | | | | | | | | |
| | d | 128 | 975 | 979 | | | | | | | | | Z1 |
| | d | 129 | 130 | 131 | | | | | | | | | Z1 |
| I'M SORRY/DEP'T LIST | * | 130 | 133 | 67 | | | 130 | | 172 | | | 176 | A99 |
| I'M SORRY/GENERAL | * | 131 | 133 | 67 | 82 | | 131 | | 172 | | | 168 | A99 |
| Pleas Hold ... | | 132 | 126 | | | | | | | | | | 126 |
| | d | 133 | 979 | COPY | 100 | &0 | | | | | | | |
| Unknown Name | | 134 | 135 | | | | | | | | | | 135 |
| | d | 135 | 977 | 981 | | | | | | | | | Z1 |
| | d | 136 | 137 | 138 | | | | | | | | | Z1 |
| 2=new;3=vs;0=Oper. | * | 137 | 137 | 81 | 975 | | 137 | | 173 | | | 176 | A99 |
| 2=new;3=vs | * | 138 | 81 | | 979 | | 138 | | 173 | | | 169 | A99 |
| | d | 139 | 140 | T> | &0 | | | | | | | | |
| | d | 140 | 106 | 106 | 106 | 106 | 106 | 105 | 105 | 105 | 105 | 105 | M2 |
| 7# or 9# = hangup | * | 141 | 113 | T1 | &3 | | | | A99 | | | | 113 |
| 7# or 9# = hangup | * | 142 | 123 | T1 | &3 | | | | A99 | | | | 123 |
| | d | 143 | 801 | T> | L3 | | | | | | | 802 | |
| | d | 144 | 113 | T> | L3 | | | | | | | 145 | |
| | d | 145 | 146 | 147 | | | | | | | | | Z1 |
| TRY AGAIN/ASSISTANCE | * | 146 | P> | 81 | | | 146 | | 148 | | 148 | 176 | A99 |
| TRY EXTENSION AGAIN | * | 147 | P> | 81 | | | 147 | | 148 | | 148 | 170 | A99 |
| 7# or 9# = hangup | * | 148 | 145 | T1 | &3 | | | | A99 | | | | 145 |
| | d | 149 | 846 | T> | L3 | | | | | | | 845 | |
| USER CODE/VMAIL | * | 150 | 151 | T# | L0 | | | | | | | 957 | A99 |
| | d | 151 | 866 | T> | L3 | 1 | | | | | | 152 | |
| USER CODE ON LIST | | 152 | 866 | | | | | | | | | | 866 |
| ENTER USER CODE | * | 153 | 867 | T# | L3 | 2 | | | | | | 154 | A99 |
| USER CODE NOT ON LST | | 154 | 867 | | | | | | | | | | 867 |
| ENTER PASSWORD | * | 155 | 156 | T# | L4 | | | | | | | A99 | A99 |
| ENTER RSPNS DIR # | * | 156 | B50 | T1 | &0 | 9 | | | | | | 157 | A99 |
| INVALID RES DIR | | 157 | 156 | | | | | | | | | | 156 |
| | d | 158 | 161 | 159 | 159 | 159 | 159 | 159 | 161 | 161 | | | W |
| | d | 159 | 161 | 160 | | | 159 | 0800 | 1700 | | | | | X |
| | d | 160 | 67 | 1 | Z1 | | | | | 1 | | | ON |
| | d | 161 | 67 | 2 | Z1 | | | | | 1 | | | ON |
| | d | 162 | 74 | T> | &0 | | | | | | | | |
| | d | 163 | 89 | T> | &0 | | | | | | | | |
| | d | 164 | 90 | COPY | 111 | T> | | | | | | | 115 |
| No Operator | | 165 | 115 | | | | | | | | | | 115 |
| No Operator | | 166 | 119 | | | | | | | | | | 119 |
| No Operator | | 167 | 125 | | | | | | | | | | 125 |
| No Operator | | 168 | 131 | | | | | | | | | | 131 |

APPENDIX A-continued

MESSAGE MATRIX 'TDD1.MTX'
* before Current Event indicates tone message
? before Current Event indicates missing message
d before Current Event indicates a dummy message
+ after R indicates that a description message exists

| Event Description | | Current Event | Next Event for Response (r) | | | | | | | | | |
|---|---|---|---|---|---|---|---|---|---|---|---|---|
| | | | r=1 | r=2 | r=3 | r=4 | r=5 | r=6 | r=7 | r=8 | r=9 | r=0 | blank |
| No Operator | | 169 | 138 | | | | | | | | | 138 |
| No Operator | | 170 | 147 | | | | | | | | | 147 |
| No Operator | | 171 | 981 | | | | | | | | | 981 |
| 7# disconnect (blnk) | * | 172 | 117 | T1 | &3 | | | | A99 | | | 117 |
| 7# disconnect (blnk) | * | 173 | 129 | T1 | &3 | | | | A99 | | | 129 |
| 7# disconnect (blnk) | * | 174 | 136 | T1 | &3 | | | | A99 | | | 136 |
| 7# disconnect (blnk) | * | 175 | 977 | T1 | &3 | | | | A99 | | | 977 |
| Please Hold... | | 176 | 39 | | | | | | | | | 39 |
| need instructs? | * | 178 | 180 | 179 | | | 155 | | | 800 | | 39 |
| | d | 179 | 65 | 66 | | | | | | | | Z1 |
| instructs to use | | 180 | 179 | | | | | | | | | 179 |
| more instructs | d | 181 | 79 | COPY | 201 | T> | | | | | | |
| more onstructs | d | 182 | 79 | COPY | 202 | T> | | | | | | |
| more | d | 183 | 79 | COPY | 203 | T> | | | | | | |
| tdd bullentin board | * | 200 | 201 | 202 | 220 | 228 | 179 | 200 | | | | 40 |
| care of batteries | * | 201 | 201 | 200 | 179 | | | | | | | 40 |
| publishers corner | * | 202 | 201 | 200 | 179 | | | | | | | 40 |
| future of tdd info | | 220 R+ | 221 | | | | | | | 1 | 60 | 4 | 221 |
| question 2 | | 221 R+ | 222 | | | | | | | 1 | 60 | 4 | 222 |
| dirad address | * | 222 | 222 | 179 | | | | | | | | 40 |
| dirad atext | | 228 R+ | 221 | | | | | | | 1 | 60 | 4 | 221 |
| more info or main | * | 245 | 200 | 179 | | | | | | | | 40 |
| ord info=1,main M=2 | * | 300 | 310 | 179 | | | | | | | 171 | 40 |
| enter name | | 310 R+ | 312 | | | | | | | | 30 | 4 | 311 |
| do again | | 311 RR | 312 | | | | | | | | 30 | 4 | 40 |
| adress | | 312 R+ | 314 | | | | | | | | 45 | 4 | 313 |
| didnt get | | 313 RR | 314 | | | | | | | | 45 | 4 | 40 |
| phone number | | 314 R+ | 316 | | | | | | | | 30 | 4 | 315 |
| didnt get | | 315 RR | 316 | | | | | | | | 30 | 4 | 40 |
| application? | | 316 R+ | 318 | | | | | | | | A4 | 4 | 317 |
| didnt get | | 317 RR | 318 | | | | | | | | A4 | 4 | 40 |
| thank you | | 318 | 179 | | | | | | | | | 179 |
| Company dist no | * | 700 | 704 | T3 | DIST | 7 | [&3] | | | | 702 | A99 |
| Personal no. | * | 701 | 704 | T3 | DIST | 8 | [&3] | [&0] | | | 702 | A99 |
| invallid list no. | | 702 | 703 | S | &3 | 702 | | | | | | 703 |
| | d | 703 | 809 | 870 | | | | | | | | Z6 |
| Editing list no... | | 704 | 705 | S | 704 | &3 | | | | | | 705 |
| 1=add;2=del; 3=purge | * | 705 | 706 | 716 | 725 | | | | | | 703 | 704 | A99 |
| UC to add | | 706 | 708 | | | | | | | | | 708 |
| Next UC to add | | 707 | 708 | | | | | | | | | 708 |
| | d | 708 | 983 | 6 | Z8 | | 715 | 711 | 704 | 715 | 1 | | ON |
| | d | 709 | 711 | 715 | A99 | 715 | 712 | 704 | 715 | | | Z9 |
| | d | 710 | 712 | 715 | A99 | 715 | 712 | 704 | 715 | | | Z9 |
| | d | 711 | 713 | T> | DIST | 1 | [&3] | [&0] | | | 714 | |
| | d | 712 | 713 | T> | DIST | 3 | [&3] | | | | 714 | |

APPENDIX B

40 U HAVE NOT RESPONDED IF U WISH TO USE THIS MACHINE PUSH UR SPACE BAR 3 TIMES GA
52 GOOD MORNING U HAVE REACHED NYSSD AUTOMATED SYSTEM FOR TTY/TTD USERS
53 GOOD AFTERNOON U HAVE REACHED NYSSD AUTOMATED SYSTEM FOR TTY/TTD USERS
54 GOOD EVENING U HAVE REACHED NYSSD AUTOMATED SYSTEM FOR TTY/TTD USERS
65 START POINT -- TO TRANSFER UR CALL TO AN EXT OR DEPT PUSH 1 FOR A BULLETIN BOARD PUSH 2 FOR INFORMATION ON TECHNOLOGY PUSH 3 TO REPEAT THIS MSG PUSH 4 FOR OPER PUSH 0 GA
66 SAME AS 65
67 PUSH FIRST 3 LETTER OF PERSON'S LAST NAME WHOM U ARE TRYING TO REACH GA
82 IF U KNOW NAME OF PERSON U R TRYING TO REACH PUSH FIRST 3 LETTER OF LAST NAME FOR A LIST OF EXTS PUSH 111 GA
90 DEPTS -- FOR ADMIN OFFICES PUSH 1 FOR HEALTH OFFICES PUSH 2 FOR DORMS PUSH 3 FOR SCHOOLS PUSH 4 TO REPT THIS MSG PUSH 5 FOR OPER PUSH 0 GA

APPENDIX B-continued

91 ADMIN OFFICES -- FOR SUPERINTENDENT PUSH 1 FOR PRINCIPAL PUSH 2 FOR DEAN OF STUDENTS PUSH 3 FOR GUIDANCE PUSH 4 FOR BUS OFFICE PUSH 5 TO REPT THIS MSG PUSH 6 FOR OPER PUSH 0 GA
92 HEALTH OFFICES -- FOR PSYCHOLOGIST PUSH 1 FOR HEALTH CENTER PUSH 2 FOR AUDIOLOGIST PUSH 3 TO REPT THIS MSG PUSH 4 FOR OPER PUSH 0 GA
93 DORMS FOR HS DORM PUSH 1 FOR ELEM DORM PUSH 2 TO RPT THIS MSG PUSH 4 FOR OPER PUSH 0 GA
94 SCHOOLS -- FOR SECONDARY HS PUSH 1 FOR ELEM PUSH 2 TO RPT THIS MSG PUSH 3 FOR OPER PUSH 0 GA
105 TRANSFERRING TO
109 THAT EXT IS BUSY
110 IS NOT IN NOW
112 THERE IS NO ANSWER
114 TO TRY THAT EXT AGAIN PUSH 1 FOR A DIFFERENT EXT PUSH 2 TO LVE A MSG PUSH 3 TO RPT THIS MSG PUSH 5 FOR AN OPER PUSH 0 GA
115 TO TRY THAT EXT AGAIN PUSH 1 FOR A

APPENDIX B-continued

|     | |
| --- | --- |
|     | DIFFERENT EXT PUSH 2 TO LVE A MSG PUSH 3 TO RPT THIS MSG PUSH 5 FOR AN OPER PUSH 0 GA |
| 118 | IF U KNOW EXT THAT U WANT PUSH 1 IF U KNOW NAME OF PERSON U WANT PUSH 2 IF U WOULD LIKE A LIST OF DEPARTMENTS PUSH 3 TO RPT THIS MSG PUSH 5 FOR AN OPER PUSH 0 GA |
| 120 | PUSH THE EXT U R TRYING TO REACH GA |
| 121 | THAT EXT IS BUSY |
| 122 | THERE IS NO ANSWER |
| 124 | & 125 |
| 131 | U HAVE ENTERED AN INVALID PERSON OR EXT TO LVE A MSG IN GENERAL TDD MAIL BOX PUSH 1 TO TRY A DIFFERENT PERSON PUSH 2 FOR A DIFFERENT EXT PUSH 3 TO RPT THIS MSG PUSH 5 FOR OPER PUSH 0 GA |
| 132 | PLS HD WHILE I CONNECT U |
| 134 | INVALID NAME |
| 137 | TO TRY THAT EXT AGAIN PUSH 1 FOR DIFFERENT EXT PUSH 2 TO LVE A MSG PUSH 3 FOR AN OPER PUSH 0 GA |
| 171 | THERE IS NO OPER AVAILABLE |
| 176 | PLS HD |
| 178 | IF Y NEED INSTRUCTIONS ON USING MACHINE PUSH 1 ON UR TOUCH TONE PHONE TO SKIP INSTRUCTIONS PUSH 2 IF U HAVE ROTARY PHONE PLS WAIT A MOMENT GA |
| 180 | THIS MACHINE WAS DEVELOPED BY DIRAD TECHNOLOGIES AND WILL ALLOW U TO TRANSFER UR CALL TO VARIOUS PEOPLE OR EXTS LVE PERSONAL MSGS AND OBTAIN INFO FROM BULLETIN BOARD MACHINE IS OPERATED BY KEYS ON TOUCH TONE PHONE (FORCED BRANCH TO 65) |
| 970 | UR RECORDING A TDD MAIL MSG TO REVIEW UR MSG PUSH 1 TO RE RECORD PUSH 3 TO DISCARD PUSH STAR KEY TO SAVE PUSH POUND KEY FOR OPER PUSH 0 TO RPT THIS MSG PUSH 5 GA |
| 790 | IF CORRECT PUSH 1 TO RETRY PUSH 2 TO RETURN TO TDD MAIL OPTIONS PUSH 9 TO RPT THIS MSG PUSH 0 GA |
| 794 | BEGIN TYPING AT GA TO REVIEW UR MSG PUSH 1 FINISHED BY PRESSING POUND KEY GA |
| 795 | RECORD UR REDIRECTED COMMENT AT GA FINISH BY PUSHING POUND KEY GA |
| 791 | IF CORRECT PUSH 1 TO RETRY PUSH 2 TO CONTINUE SEEING UR MSGS PUSH 9 TO RPT THIS MSG PUSH 0 GA |
| 783 | UR REPLYING TO |
| 786 | UR REDIRECTING A MSG |
| 794 | BEGIN TYPING AT GA TO REVIEW UR MSG PUSH 1 FINISH BY PUSHING POUND KEY GA |
| 795 | TYPE YOUR REDIRECT COMMENT MSG AT THE GA FINISHED BY PUSHING POUND KEY GA |
| 808 | FOR PERSONAL OPTIONS PUSH 4 TO LVE A MSG FOR ANOTHER USER PUSH 5 TO EXIT TDD MAIL PUSH 9 TO PRT THIS MSG PUSH 0 GA |
| 970 | UR RECORDING A TDD MAIL MSG TO REVIEW UR MSG PUSH 1 TO RE RECORD PUSH 3 TO DISCARD PUSH STAR KEY TO SAVE PUSH POUND KEY FOR OPER PUSH 0 TO RPT THIS MSG PUSH 5 GA |

APPENDIX C

Helpful Hints - Common TTY/TTD Terms

| | |
| --- | --- |
| TDD | telecommunication Device for the Deaf |
| GA | Go Ahead, your turn to type |
| SK | Stop Key, meaning end of conversation |
| CUZ | Because |
| HD | Hold, please |
| PLS | Please |
| OIC | Oh, I see |
| U | You |
| UR | Your |
| CD | Could |
| Q | Question mark |
| MTG | Meeting |
| R | Are |

APPENDIX C-continued

Helpful Hints - Common TTY/TTD Terms

| | |
| --- | --- |
| NBR | Number (Also NU) |
| OPR | Operator |
| CUL | See you later |
| SHD | Should |
| TMW | Tomorrow |

APPENDIX D

TDD MAIL OPTIONS

Dial TDD/ in system - when system answers, Press 9.
The first thing TDD Mail will tell you is how many
new and old message are in your mailbox.
Remember, to use the system successfully, carefully
read menus, and wait for the GA (Go Ahead)
You will then be prompted to select one of the
following Options. Make your selection by pressing
the appropriate key on your touch tone phone.
    1  Print new messages
    2  Print old messages.
    3  Print discarded messages.
    4  Personal Options.
    5  Leave a message for another user.
    9  Exit TDD Mail. Terminate call.
    0  Reprint this menu.

PRINTING

To print old, new or discarded messages, simply
select the appropriate option from the TDD Mail
Option Menu.
The system will begin printing your messages, one at
a time, in the order they arrive in your mailbox.
For messages sent today, only the time of the message
will be printed. If the message was sent earlier,
both the date and the time will be printed.
You may select any of the following options while the
message is playing or at its completion:
    1  Reprint current message
    7  Leave a message for another user on the system.
    9  Return to TDD Mail Options
    #  To save the message and continue.
    *  To discard the message and continue.

PERSONAL OPTIONS

When you access your mailbox, selection option 4 from
the TDD Mail Options menu:
    1  Print new messages.
    4  Personal Options.
    5  Leave a message for another user. Follow instructions.
    9  Exit TDD Mail. Terminate call.
    0  Repeat this Menu.
You will see the choices for reviewing and changing
your personal options.
    1  Review or change your current office status.
    2  Review or change your current greeting.
    3  Review or change your current printed name.
    4  Change your extension.
    5  Change your password.
    9  Return to TDD Mail options.
Office status:
    1  To review.
    2  To change.
    9  To return to TDD Mail options.
After you have entered a change, you will be prompted
to press:
    1  To save.
    2  To rerecord.
    9  Exit without saving.

OFFICE STATUS

TDD Mail offers three choices for office status:
    0  In.
    1  Out.
    2  Transfer to TDD Mail.
If you select IN, the Automated Attendant will
transfer incoming calls to your office. If there is
no answer, the caller will be prompted to leave a TDD

APPENDIX D-continued
TDD MAIL OPTIONS

Mail message.
If you select OUT, the Automated Attendant will tell the caller you are not in and prompt them to leave a message.
If you select TRANSFER to TDD Mail, callers will read your recorded greeting and then be prompted to leave a message.

GREETING
This is your personal greeting that will print for outside callers before they leave a message for you. You may type anything you like. You may mention a time that you will be in or another number where you can be reached.
You will type the announcement you want read. Remember to end with the # sign. (Pound Sign)

PRINTED NAME
This is the typed name that is printed for callers when they enter your extension.
You will type the name you want read. Remember to end with the # sign.

EXTENSION
The Automated Attendant will use this extension to transfer calls. TDD Mail will use the extension to provide the message waiting light notification at your office, if your phone system supports this feature.

PASSWORD
You may change your TDD mailbox password. Follow menu.

PERSONAL LISTS
You may create up to ten personal lists, numbered 010 to 019, for groups you send messages to on a regular basis. For example, to send to all faculty, you would create a list containing each of their names and then simply use the list number when sending messages.
To create a list, select option 7 from the Personal Options menu then enter the number of the list you wish to create or change. Next you will be prompted to press:
  1 To add a name to a list.
  2 To delete a name from a list.
Enter the user code (first three letters of the last name) for the first person you want on the list. Once you have uniquely identified that individual and confirmed that he is the one you want on the list, you will be able to add a second name. Continue until you have added all the names you want.
To delete one or more names, follow the same steps.
To use the list when sending a message, simply use the list number in place of a personal user code.

What is claimed is:

1. An automated interactive telephone communication system for connection to a two-way telephone subscriber network for automated processing of communication signals from an individual caller communicating therewith over a telephone subscriber network with a TDD (telecommunications device for the deaf) device coupled to said network, said system comprising:
  means for receiving communication signals from said caller's TDD;
  a computer database containing a plurality of separately addressed, digitally encoded TDD displayable messages, at least one of said messages having an associated TDD mode character;
  means for processing a received communication signal according to a predefined control matrix, said processing means including means for retrieving one of said separately addressed TDD displayable messages for transmission to said caller's TDD; and
  means for transmitting said retrieved TDD displayable message to said caller's TDD for display, wherein when said retrieved TDD displayable message comprises said at least one message having said associated TDD mode character, said associated TDD mode character precedes said at least one message and places said caller's TDD in a proper receiving mode for said at least one message to be displayed.

2. The automated interactive telephone communication system of claim 1, wherein each of said plurality of separately addressed, digitally encoded, TDD displayable messages has an associated TDD mode character so that when one of TDD displayable said plurality of messages is transmitted to said caller's TDD for display, said associated TDD mode character ensures that said caller's TDD is in proper mode for display of said one TDD displayable message.

3. The automated interactive telephone communication system of claim 2, wherein at least some of said plurality of TDD displayable messages comprise multiple words, and wherein each of said words has an associated TDD mode character for ensuring that said caller's TDD is in proper mode for display of the word.

4. The automated interactive telephone communication system of claim 1, wherein said TDD mode character associated with said at least one message is stored in said computer database such that said character precedes said at least one message upon retrieval thereof.

5. The automated interactive telephone communication system of claim 1, wherein said at least one message includes a letter-type message, and wherein said associated TDD mode character for said letter-type message comprises a letter mode Baudot tone.

6. The automated interactive telephone communication system of claim 1, wherein said at least one message includes a number-type message, and wherein said associated TDD mode character for said number-type message comprises a number mode Baudot tone.

7. The automated interactive telephone communication system of claim 1, wherein said caller's TDD is coupled to a conventional touch-tone-type telephone and said touch-tone-type telephone is connected to said network, and wherein said communication signals comprise DTMF telephone signals generated by said touch-tone-type telephone.

8. The automated interactive telephone communication system of claim 7, wherein said plurality of TDD displayable messages stored in said computer database are coded in Baudot and when decoded by a TDD, include abbreviated words displayable for viewing on the TDD.

9. The automated interactive telephone communication system of claim 1, wherein said system can accommodate voice, Baudot and ASCII communication signals.

10. The automated interactive telephone communication system of claim 9, wherein said system can accommodate multiple voice, Baudot and ASCII communication signals simultaneously.

11. The automated interactive telephone communication system of claim 1, wherein said processing means includes means for retrieving multiple separately addressed TDD displayable messages from said computer database for transmission of said caller's TDD in response to a received communication signal, said processing means further including means for concatenating said multiple retrieved TDD displayable messages for transmission to said caller's TDD.

12. The automated interactive telephone communication system of claim 11, wherein each of said plurality of separately addressed digitally encoded TDD displayable messages has an associated TDD mode character, and wherein said concatenating means further includes means for accommodating each TDD mode character associated with one of said multiple retrieved TDD displayable messages.

13. An automated method at a station connected to a two-way telephone subscriber network for interactively responding to a telephone call from an individual communicating therewith over said telephone subscriber network using a TDD (telecommunications device for the deaf) device coupled to said network, said TDD device having at least two character modes, said method comprising the steps of:

receiving at said station a communication signal from said individual caller;

transmitting over said network a first machine displayable control option to said individual caller's TDD device, said first transmitted displayable control option being preceded by an associated mode character for ensuring that said individual call's TDD is in proper character mode for display of said first displayable control option, said individual caller selecting a desired control option by generating a predefined communication signal for transmission over said network to said station;

automatically processing a received communication signal representative of a selected control option according to a predefined control matrix, said processing of said selected option including retrieving from an associated database one of a plurality of separately addressed digitally encoded TDD displayable message for transmission to said individual caller's TDD device over said network; and transmitting said retrieved TDD displayable message over said network to said individual caller's TDD device.

14. The automated method of claim 13, wherein said individual caller's TDD device is coupled to a conventional touch-tone-type telephone and said touch-tone-type telephone is connected to said network, and wherein said receiving step includes receiving at said station DTMF telephone signals from said individual caller.

15. The automated method of claim 14, wherein said receiving step further includes converting said DTMF signals to digital signals for processing and wherein said transmitting step includes converting retrieved digitally encoded TDD displayable messages to analog tone signals for transmission over said network.

16. The a method of claim 13, wherein each retrieved TDD displayable message in said associated database includes an associated mode character which insures that said individual caller's TDD device is in proper mode for display of the retrieved message.

17. The automated method of claim 16, wherein each of said associated mode characters for said plurality of messages comprises one of a shift letter Baudot tone and a shift number Baudot tone.

18. The automated of claim 13, wherein said receiving step further includes receiving at said station multiple communication signals from multiple individual callers, each of said communication signals comprising one of a voice, Baudot or ASCII communication signal.

19. The automated method of claim 13, wherein said processing step includes retrieving multiple separately addressed TDD displayable messages for transmission to said individual caller's device in response to a received communication signal, said processing step further including concatenating said multiple TDD displayable messages for transmission to said individual caller's TDD device.

* * * * *

UNITED STATES PATENT AND TRADEMARK OFFICE
CERTIFICATE OF CORRECTION

PATENT NO. : 5,253,285
DATED : Oct. 12, 1993
INVENTOR(S) : Alheim

It is certified that error appears in the above-indentified patent and that said Letters Patent is hereby corrected as shown below:

Title page:
Item: [76] Inventor: delete "Curtis C. Alheim, 4 Anne Dr., Schenectady, N.Y. 12303" and substitute therefor
--Curtis C. Alheim, 14 Anne Dr., Schenectady, N.Y. 12303--

Column 22, line 12, delete "TDD displayable".

Column 22, line 12, insert after "of" (second occurrence) --TDD displayable--.

Column 23, line 25, delete "call's" and substitute therefor --caller's--.

Column 23, line 38, delete "message" and substitute therefor --messages--.

Column 24, line 17, delete "a" and substitute therefor --automated--.

Signed and Sealed this

Fifth Day of April, 1994

Attest:

BRUCE LEHMAN

Attesting Officer      Commissioner of Patents and Trademarks